United States Patent [19]
Ackerman et al.

[11] Patent Number: 6,058,694
[45] Date of Patent: May 9, 2000

[54] GAS TURBINE ENGINE COMMANDED OIL FLOW VALVE WITH FAILSAFE

[75] Inventors: Steven C. Ackerman, Scottsdale; Brian S. Berry; Vincent A. Pedotto, both of Tempe, all of Ariz.

[73] Assignee: AlliedSignal Inc., Morris Township, N.J.

[21] Appl. No.: 08/967,404

[22] Filed: Nov. 11, 1997

[51] Int. Cl.[7] .................................................. F01B 19/00
[52] U.S. Cl. ................................. 60/39.08; 184/6.11
[58] Field of Search ........................ 60/39.08, 39.02; 184/6.11

[56] References Cited

U.S. PATENT DOCUMENTS

| | | |
|---|---|---|
| 2,672,010 | 3/1954 | Newcomb . |
| 2,672,278 | 3/1954 | Newcomb . |
| 3,527,054 | 9/1970 | Hemsworth . |
| 3,703,081 | 11/1972 | Krebs et al. ........................... 60/39.08 |
| 3,774,400 | 11/1973 | Edmunds ................................. 60/358 |
| 4,041,697 | 8/1977 | Coffinberry et al. .................. 60/39.08 |
| 4,211,070 | 7/1980 | Portmann ............................... 60/39.08 |
| 4,245,465 | 1/1981 | Milo . |
| 4,497,172 | 2/1985 | Smith . |
| 4,569,196 | 2/1986 | Waddington et al. . |
| 4,717,000 | 1/1988 | Waddington et al. .................. 184/6.11 |
| 4,782,658 | 11/1988 | Perry ....................................... 60/39.08 |
| 5,018,601 | 5/1991 | Waddington et al. . |
| 5,067,454 | 11/1991 | Waddington et al. ............... 123/196 S |

*Primary Examiner*—Ted Kim
*Attorney, Agent, or Firm*—Robert Desmond, Esq.

[57] ABSTRACT

An improved oil flow reduction valve regulates the flow of lubricant to the fan reduction gearbox of a turbine engine, or other accessories requiring lubrication as a function of engine load. The invention takes advantage of the strong correlation between the gear torque output of the engine and the engine compressor discharge pressure by metering oil flow as a function of compressor discharge pressure. In one embodiment a metering valve employs a sense piston that receives a pressure signal from the compressor section of the engine. In response to the pressure signal, the sense piston moves a slide valve which blocks or uncovers one or more output orifices to regulate the flow of oil through the metering valve. The valve is preferably configured to allow maximum oil flow in the event the valve should fail or in the event the compressor discharge pressure signal is lost, to ensure safe operation of the lubricated components.

5 Claims, 6 Drawing Sheets

GAS TURBINE ENGINE COMMANDED OIL FLOW VALVE WITH FAILSAFE

BACKGROUND OF THE INVENTION

This application relates to gas turbine engines in general and in particular to methods and apparatus for regulating the flow of lubricating oil in a gas turbine engine.

Many applications for gas turbine engines involve the use of an engine driven gearbox or other accessories supplied with oil from an engine-driven oil pump. For example, a turbofan jet engine designed for use in aircraft typically includes a fan reduction gearbox coupled between the shaft of the gas turbine engine, which turns at a high rate of speed, and the turbofan shaft which must turn at a substantially lower speed. Such engine driven gearboxes are typically supplied with oil for heat dissipation and lubrication by a positive displacement oil pump, directly or indirectly driven by the engine shaft, in combination with an oil pressure regulator gear torque. Generally, the oil supply system is sized to ensure that the supply of the oil to the gears is sufficient to maintain proper operation at the maximum gear torque condition. Accordingly, at gear torque levels below maximum, the supply of oil to the gearbox exceeds that necessary to maintain the satisfactory operation of the gears. Moving parts within the gearbox churn the excess lubricant, thereby consuming energy and generating waste heat, which reduces engine efficiency and oil service life.

As disclosed in U.S. Pat. No. 4,569,196 issued Feb. 11, 1986 to Waddington, it has been suggested that engine efficiency could be increased by employing a flow reduction valve that operates to reduce oil flow as a function of the altitude at which the engine is operating. The altitude compensating flow reduction valve taught by Waddington recognizes that the power output of an aircraft engine, necessary to maintain stable flight, decreases with altitude. The valve taught by Waddington, however, does not actually measure engine load. Accordingly it does not adjust the flow of oil in direct relationship to engine load. Accordingly, what is needed, and what the prior art lacks, is an oil flow control valve that matches the flow of oil to the actual requirements of the lubricated units.

SUMMARY OF THE INVENTION

An improved oil flow reduction valve in accordance with the present invention regulates the flow of lubricant to a gearbox or other engine accessory as a function of engine gear torque level, which is proportional to engine load, rather than merely as a function of altitude. The invention takes advantage of the strong correlation between the gear torque level of the engine and the engine compressor discharge pressure by metering oil flow as a function of compressor discharge pressure. In one embodiment of the present invention the flow of oil is controlled by a metering valve. The metering valve employs a sense piston that receives a pressure signal from the compressor section of the engine. In response to the pressure signal, the sense piston moves a metering piston which gradually blocks or uncovers one or more output orifices to regulate the flow of oil through the metering valve. The sense piston and metering piston are arranged such that the flow of oil is increased as the compressor discharge pressure increases and is decreased as the engine compressor discharge pressure decreases. The illustrative valve is also configured to allow maximum oil flow in the event the valve should fail or in the event the compressor discharge pressure signal is lost. In this way, safe operation of the lubricated components is assured even though some fuel efficiency may be temporarily sacrificed.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

The drawing figures are intended to illustrate the general manner of construction and are not to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

Figure 1:
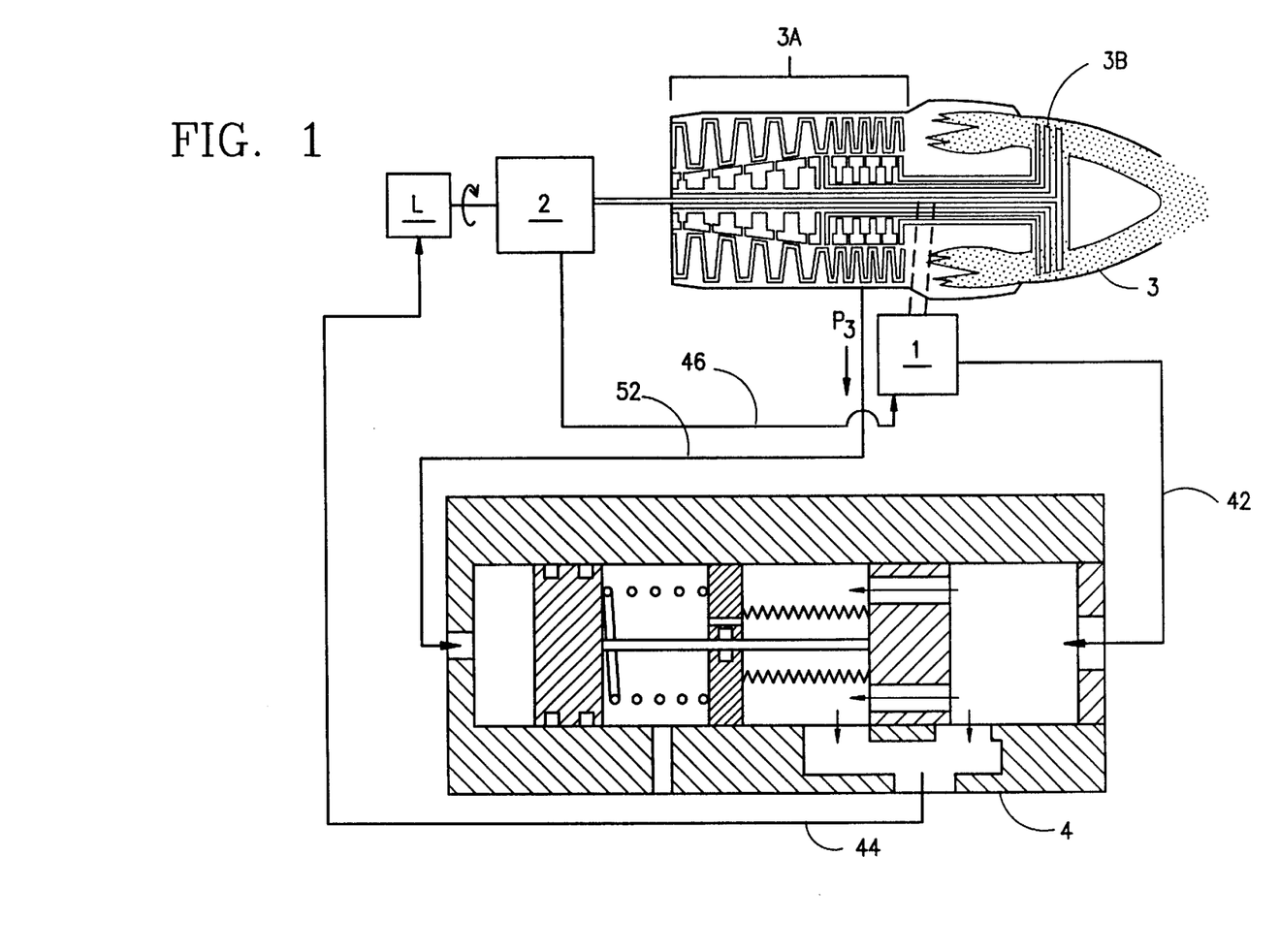
FIG. 1 is a schematic showing the oil flow circuit for a turbine engine having a flow regulator valve incorporating features of the present invention.

FIG. 1 shows an oil flow circuit in accordance with the invention, including a source of oil under pressure 1, an oil-requiring component, such as a gearbox 2 and a gas turbine engine 3, including a turbine 3B and a compressor section 3A. A flow of oil from source 1 flows through fluid passage 42 to flow regulator 4 and from flow regulator 4 through fluid passage 44, to gearbox 2. Oil drain 46 conveys oil from gearbox 2 back to source 1.

For the purposes of illustration, it may be assumed that the engine 3 drives an external load L such as a bypass fan of a fan-type gas turbine engine through a multiplicity of gears (not shown) housed within the gearbox 2. The source of oil under pressure 1 is typically a positive displacement pump driven by the engine shaft with a constant pressure regulator so that the oil pump provides a constant oil flow over the entire operating range of the engine.

Although optimum efficiency dictates that the engine 3 be operated at substantially constant rotational speed regardless of the gear torque output of the engine, at less than maximum gear torque output levels the lubrication requirements of the gearbox 2 are reduced. The oil pump provides constant oil flow to the engine over the entire operating range. Because the oil pump must be designed to deliver sufficient oil for the maximum gear torque level which occurs at the design shaft speed of the engine, at reduced gear torque levels, (i.e. shaft speed below the design speed), the oil pump will deliver an excess supply of oil to the gearbox 2.

If oil is present in the gearbox 2 in excess of its requirements for satisfactory lubrication and heat dissipation, the gears churn the excess oil wasting energy. This results in a loss of engine performance and generates additional heat that must be dissipated to the atmosphere. By reducing the amount of oil in the gearbox at lower gear torque levels, when gearbox oil requirements are reduced, the overall efficiency of the engine system will increase.

Figure 2:
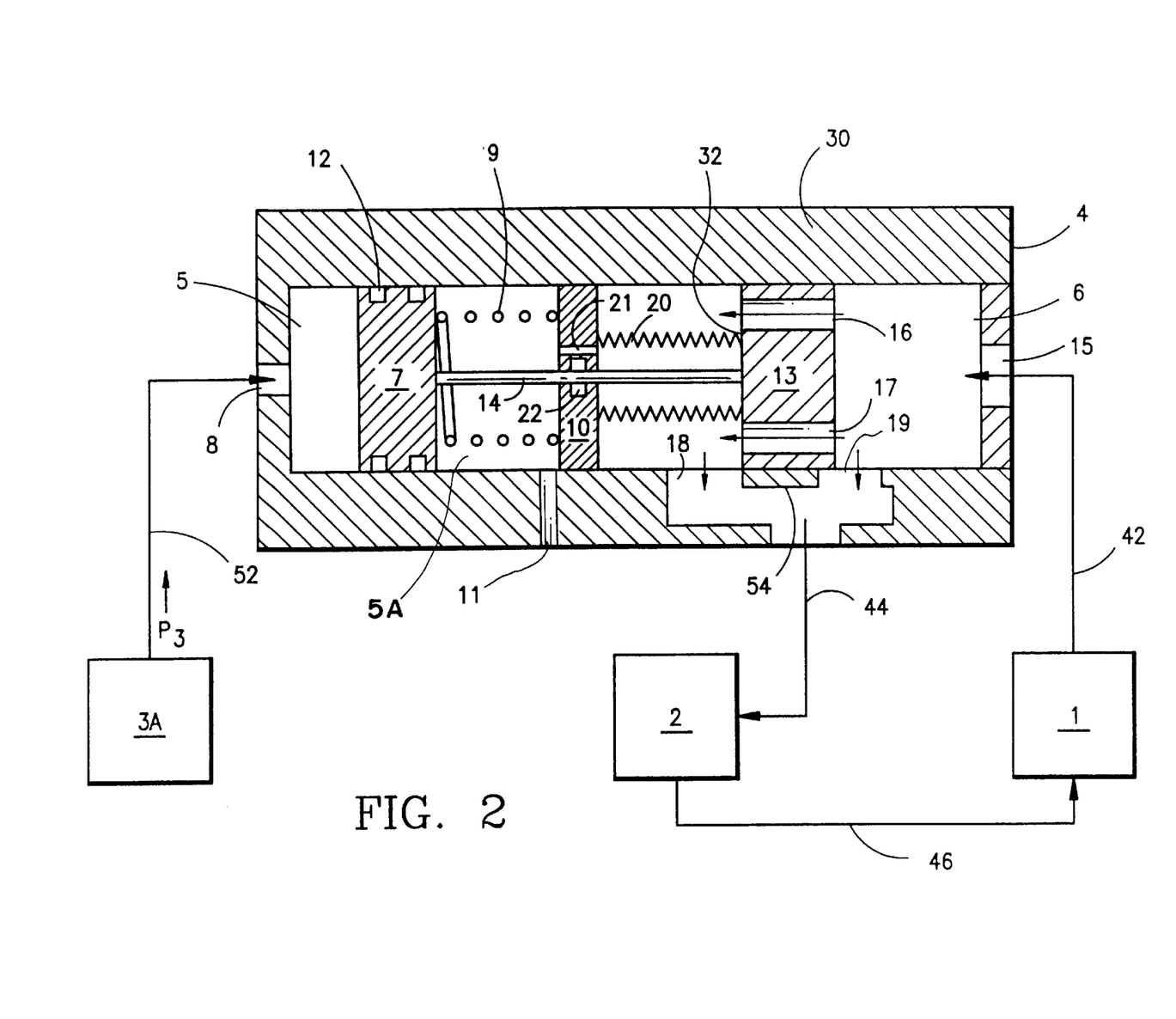
FIG. 2 is a schematic showing the positions of the metering valve piston and the sense piston of the flow regulator valve of FIG. 1 when the engine is operating at maximum gear torque levels.

Referring now to FIG. 2, an oil flow regulator slide valve 4 incorporating features of the present invention is shown in cross section. The oil flow regulator slide valve 4 comprises a housing 30 defining two main chambers, the sensing chamber 5 bounded by housing 30 and the center wall 10 and the metering chamber 6 also bounded by housing 30 and the center wall 10. Disposed within sensing chamber 5 is sense piston 7. High pressure air from the compressor section 3A (indicated as $P_3$) is conveyed by passage 52 to inlet 8, where it enters the sensing chamber 5 and is dead-headed against sense piston 7. A resilient member, such as sense piston spring 9 biases the sense piston 7 against the pressure $P_3$. A connecting rod 14 connects the sense piston 7 to the metering piston 13, which is disposed within metering chamber 6. When the discharge pressure from the compressor section 3A is low, indicating a low engine load and hence less than maximum gear torque, the piston will move under the force of the spring all the way toward inlet 8, hereinafter referred to as the "low pressure position." Conversely, when the pressure from compressor section 3A is high, indicating a high engine load and hence torque levels near or at maximum, the sense piston 7 will move away from inlet 8, until metering piston 13 is centered between outlets 18 and 19, hereinafter referred to as the "high pressure position." Piston seal 12 seals sense piston 7 to the wall of the chamber 7. The ambient chamber 5A opposite the surface of the piston that is exposed to pressure $P_3$ is open to the ambient pressure through inlet 11 preventing a pressure buildup behind sense piston 7 from interfering with the operation of sense piston 7. The inlet 11 also acts as a vent to prevent the hot compressor gasses from entering metering chamber 6, which could result in foaming and heating of the oil passing through metering chamber 6.

Disposed within metering chamber 6 is the metering piston 13 which separates the chamber into two sections. Connecting rod 14 connects the metering piston 13 to the sense piston 7 to cause sense piston 7 and metering piston 13 to move in unison. Oil from the oil pump 1 enters a first section of chamber 6 through inlet 15 and then flows through passages 16, 17 in metering piston 13 into the second section of chamber 6. The oil exits the chamber 6 to the gearbox 2 through outlets 18, 19. As more fully described below, the amount of oil that is allowed to flow to gearbox 2 depends on the position of metering piston 13, which acts as a slide valve to restrict the total area of outlets 18, 19 that is exposed to chamber 6 at any given time for the passage of oil out of chamber 6.

In the illustrative embodiment, the metering chamber 6 is sealed from the sense chamber 5 in two ways, only one of which would be used in a given application. In one embodiment of the invention a bellows seal 20 is fitted around the connecting rod 14 and connected to center wall 10 and surface 32 of the metering piston 13. When a bellows seal is employed, a passage 21 should be included in the center wall 10. Passage 21 allows the interior of the bellows seal 20 to communicate with the ambient pressure in the sense chamber 5 entering through inlet 11. Therefore, passage 21 will allow the pressure in the interior of the bellows seal 20 to remain constant and not interfere with the operation of the valve. In an alternative embodiment also depicted in FIG. 2, the connecting rod 14 is sealed by a conventional shaft ring seal 22 that is seated in the center wall 10 and fitted around connecting rod 14. Where ring seal 22 is employed, passage 21 and bellows seal 20 would not be present.

FIG. 2 depicts the flow through oil flow regulator slide valve 4 when the engine is operating at its highest gear torque setting such that maximum oil flow is required. At this engine setting the pressure from compressor section 3A is at its maximum rated pressure. Accordingly, the pressure $P_3$ moves sense piston 7 away from the low pressure position, compressing spring 9 until the spring force is balanced with the force due to P3 pressure acting on surface area of piston 7. In this position, the metering piston 13 is axially located between outlets 18,19. With outlets 18,19 uncovered to their maximum net area, maximum flow is allowed. As can be seen from FIG. 2, the size of land 54 relative to the thickness of metering piston 13 can be varied to provide a range of pressures $P_3$ which, would permit the position of metering piston 13 within metering chamber 6, to be modulated by the varying pressure $P_3$, without any net increase in the uncovered area of outlets 18, 19. Similarly, the aspect ratio of outlets 18 and 19 can be varied to provide an increase in the oil flow relative to $P_3$ pressure.

As the engine gear torque level is decreased from maximum, the pressure from compressor section 3A entering the sense chamber 5 through inlet 8 decreases. This drop in pressure causes the sense piston 7 and therefore the metering piston 13 to move toward the low pressure position. After a certain amount of travel toward the low pressure position, the metering piston 9 leaves outlet 19 fully uncovered as it increasingly blocks outlet 18, thereby decreasing the net uncovered area of outlets 18 and 19. The decrease in net uncovered area of outlets 18 and 19 results in a corresponding decrease in oil flow.

Figure 3:
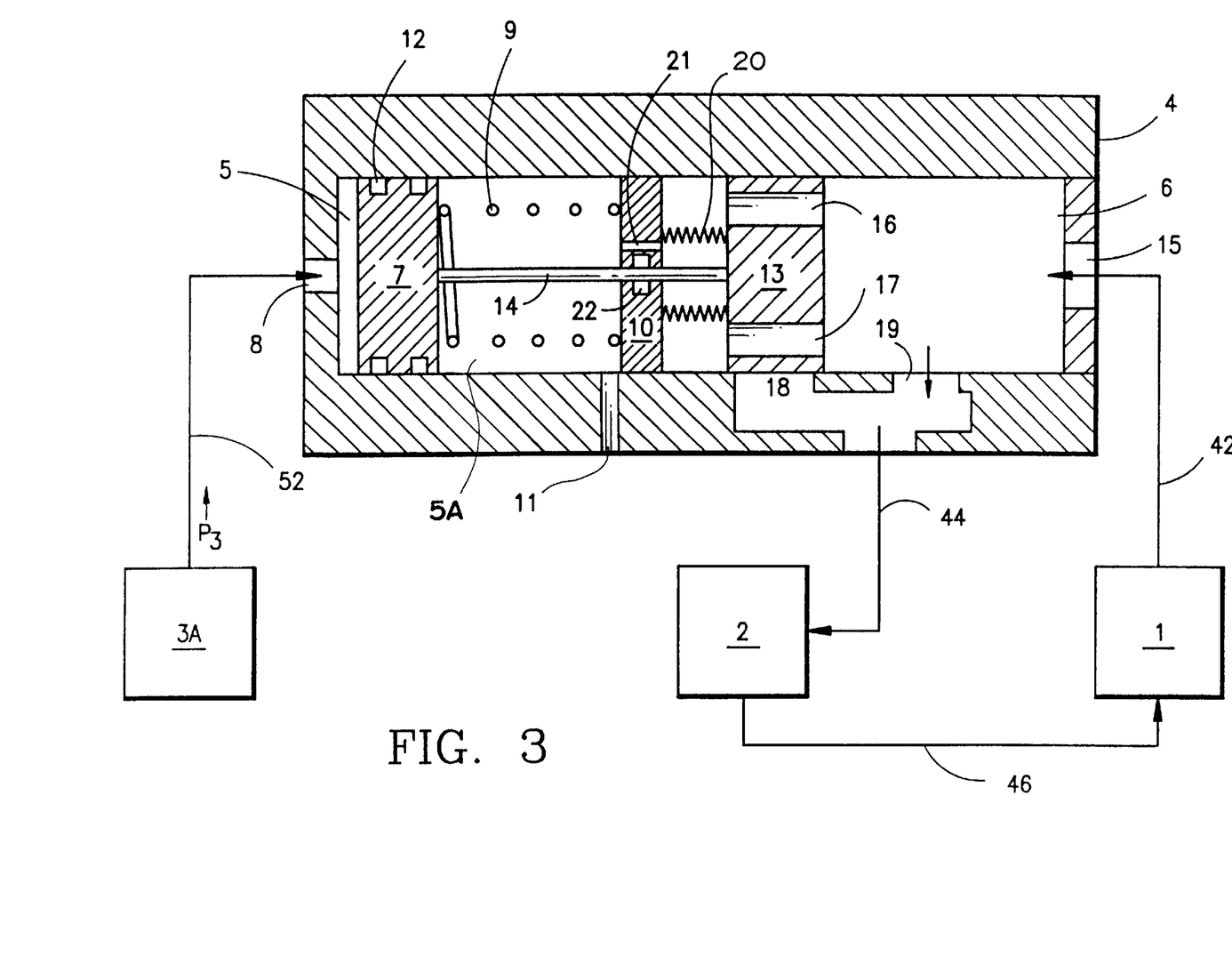
FIG. 3 is a schematic showing the positions of the metering valve piston and sense piston of the flow regulator valve of FIG. 1 when the gas turbine is operating at minimum gear torque levels.

FIG. 3 depicts the flow through oil flow regulator slide valve 4 when the engine is operating at its lowest operational gear torque condition. At this gear torque level the pressure from compressor section 3A is at a minimum for an operating engine. Accordingly, the force exerted by pressure $P_3$ on sense piston 7 balances the force exerted by sense piston spring 9 with the metering piston 13 fully covering outlet 18. With the metering piston 13 in this position, the net uncovered area is at a minimum, with oil flowing only through outlet 18.

Figure 4:
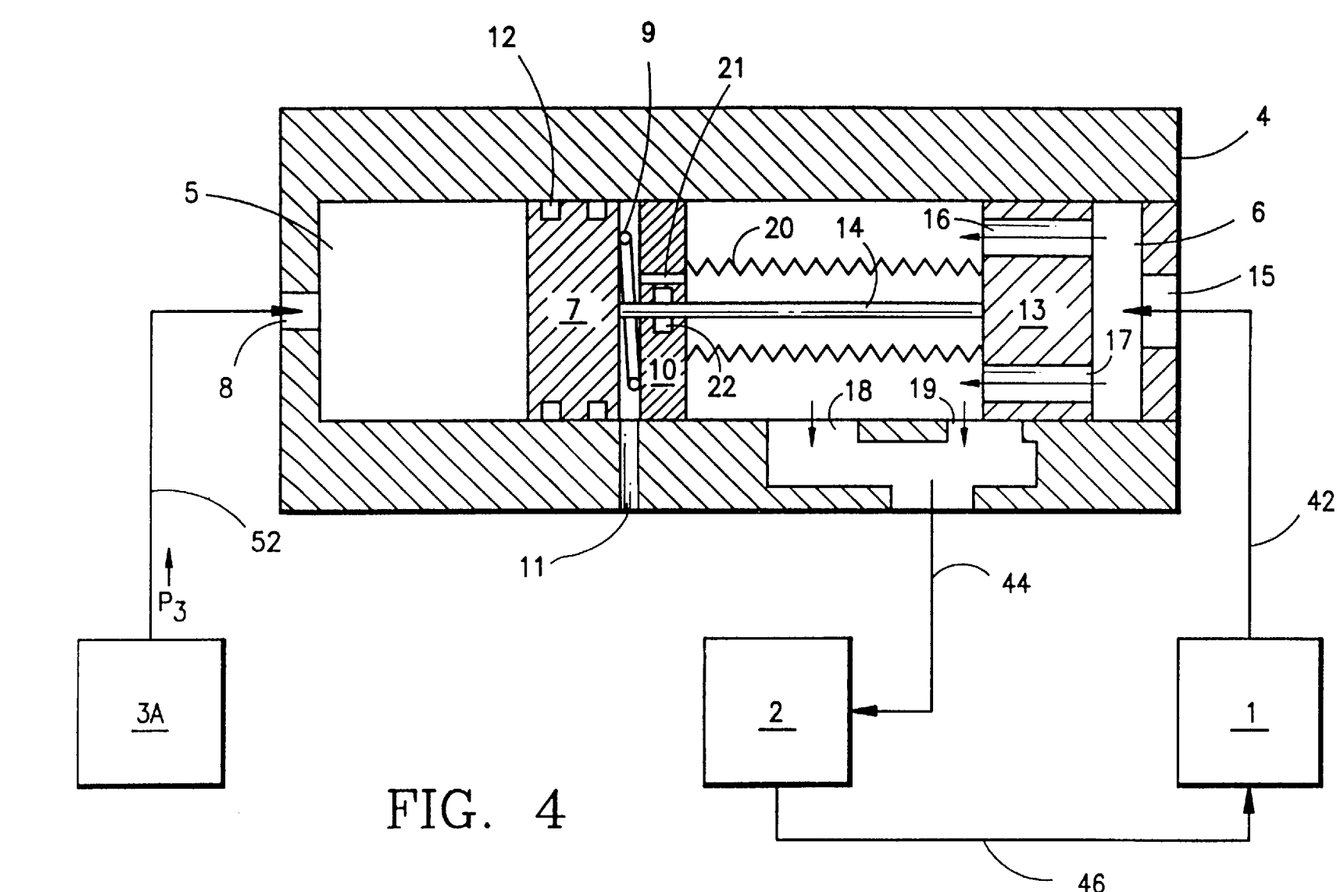
FIG. 4 is a schematic showing the positions of the metering valve piston and the sense piston of the flow regulator valve of FIG. 1 when the main sense spring of the valve has failed.

The illustrative valve also incorporates certain failsafe features that will allow 100% flow in the event of a system malfunction. FIG. 4 illustrates the position of the pistons in the event that the sense spring 9 should fail. If this were to occur, the compressor discharge pressure $P_3$ entering through inlet 8 would push the sense piston past the high pressure position until a mechanical limit stop prevented further motion. In this position, the metering piston 13 is pushed past both outlets 18,19 and therefore exposes the maximum net flow area. Since the metering piston 13 itself provides no substantial flow restriction, all of the oil entering metering chamber 6 will flow through metering piston 13 with no appreciable pressure drop and then out of metering chamber 6 through outlets 18 and 19 at the maximum flow rate.

Figure 5:
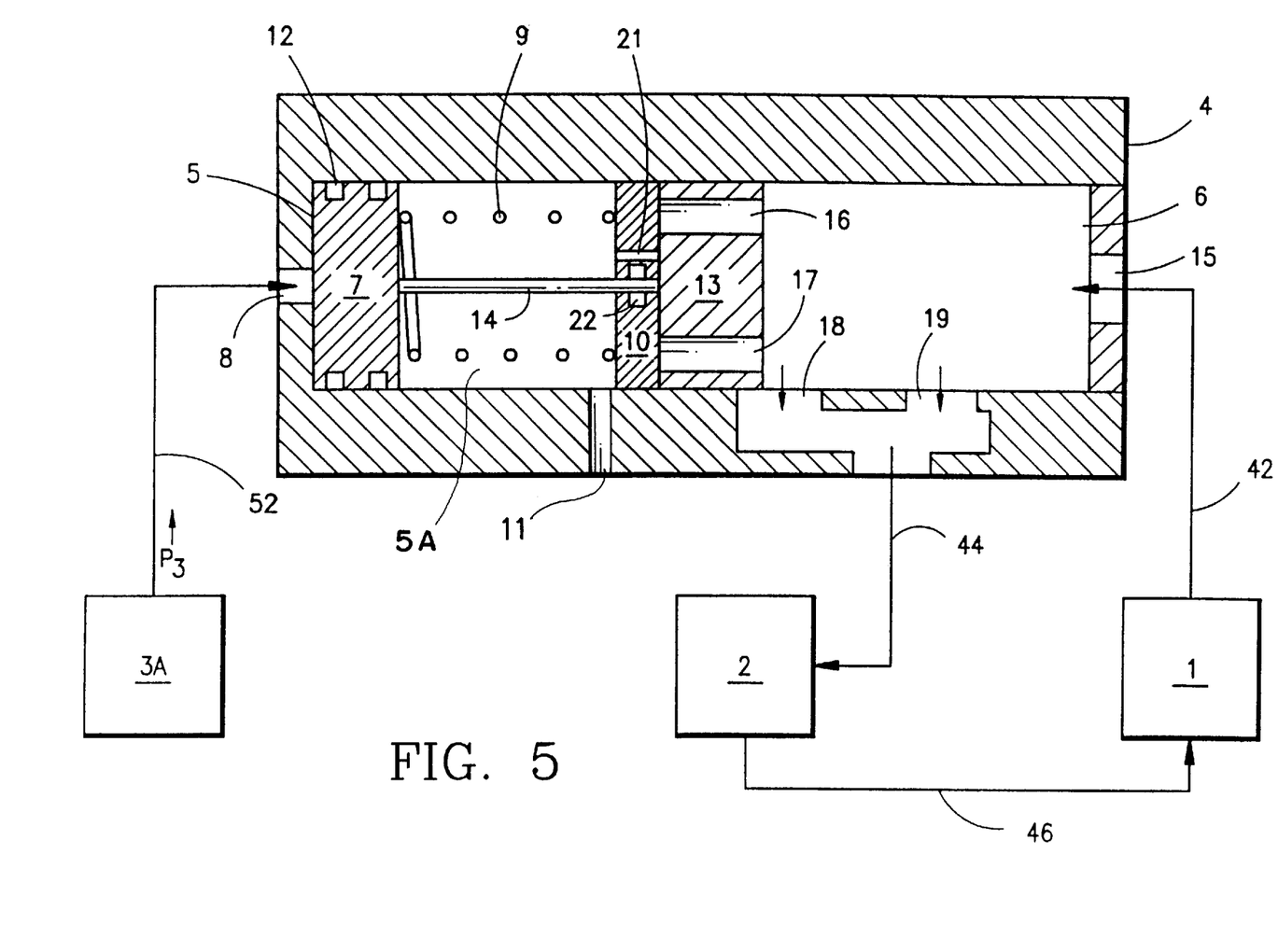
FIG. 5 is a schematic showing the positions of the metering valve piston and the sense piston of the flow regulator valve of FIG. 1 when the pressure signal from the engine compressor section is lost.

FIG. 5 illustrates the position of sense piston 7 and metering piston 13 in the event that the compressor discharge pressure $P_3$ entering the sense chamber 5 through inlet 8 falls below a predetermined level corresponding to the minimum operating compressor discharge pressure. Such a pressure condition would indicate a leak or blockage of the passage 52 carrying pressure signal $P_3$ or would indicate that the engine was being shut down. Under these conditions, the sense spring 9 will push the sense piston 7 and move metering piston 13 past both outlets 18 and 19 until further motion of sense piston 7 and/or metering piston 13 is impeded by a mechanical limit stop. With the metering piston 13 in this position, the net uncovered area of outlets 18 and 19 is at least equal to the maximum net uncovered area depicted in FIG. 2 and, therefore, the maximum flow rate is again achieved.

Figure 6:
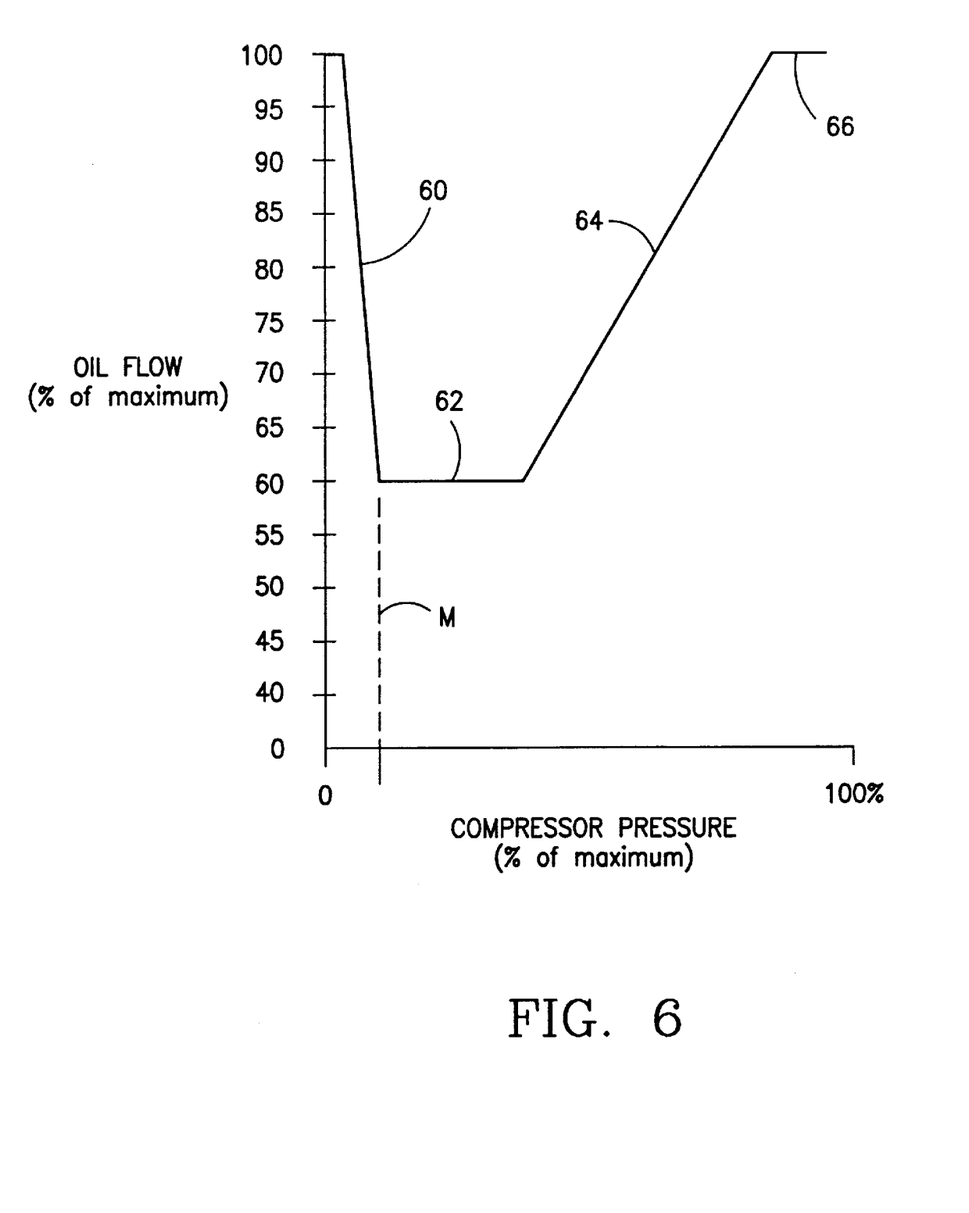
FIG. 6 is a graph showing oil flow as a function of engine compressor discharge pressure for an illustrative embodiment of the present invention.

FIG. 6, is a graphical plot of oil flow to the gearbox as a function of pressure from the compressor section 3A for a typical application of a flow control valve incorporating features of the present invention. As shown by the area of the plot indicated by reference 62, for an idling engine or for an engine operating at high altitude, compressor discharge pressure is in the minimum operational pressure range and oil flow is reduced. Such reduced flow is sufficient for satisfactory operation of the fan reduction gearbox and other units requiring lubrication at the minimum operational load of the engine. Yet, the reduced oil flow conserves energy that would otherwise be wasted due to churning of the excess oil in the gearbox.

As compressor discharge pressure increases above minimum, the oil flow remains at 60% as indicated by reference 62 until, at a predetermined pressure, oil flow begins to increase as a function of compressor discharge pressure as indicated by the portion of the plot indicated at reference 64. The increased oil flow accommodates the increased lubrication requirements of the gearbox and other accessories as the load increases. As indicated by reference 64, oil flow continues to increase with increasing compressor discharge pressure until, as indicated by reference 66, oil flow reaches 100% of the oil system design flow at or near the maximum gear torque load on the gearbox.

As shown in FIG. 6, a flow control valve incorporating features of the present invention also includes shutdown and failsafe features. If compressor discharge pressure falls below the minimum operational pressure, indicating a leak or blockage of passage 52, or that the engine is being shut down, the flow control valve opens to allow maximum flow of oil as indicated by reference 60. In a shut down condition, the brief increase in oil flow helps provide a final cooling of the gearbox and other lubricated units. In a failure condition, the increased oil flow ensures that the gearbox and other lubricated units are fully lubricated until the leak or blockage of passage 52 can be repaired.

Although certain preferred embodiments and methods have been disclosed herein, it will be apparent from the foregoing disclosure to those skilled in the art that variations and modifications of such embodiments and methods may be made without departing from the spirit and scope of the invention. Accordingly, it is intended that the invention shall be limited only to the extent required by the appended claims and the rules and principles of applicable law.

What is claimed is:

1. An engine lubrication system for controlling a flow of lubricant as a function of engine load of a turbine engine, said turbine engine having a compressor section and a turbine section, said lubrication system comprising:

a source of lubricant under pressure;

a unit requiring lubrication;

a valve having a moveable regulating member in fluid communication with said source and in fluid communication with said unit for regulating the flow of lubricant from said source to said unit, said valve comprising a slide valve, said slide valve comprising a housing having a chamber, said chamber having an inlet and a plurality of outlets, and wherein said moveable regulating member comprises a slide valve piston being moveable to at least partially block one of said plurality of outlets;

a sensing chamber in fluid communication with the discharge of said compressor section a sensing piston, said sensing piston operating to move said moveable regulating member in response to the pressure in said sensing chamber for regulating the flow of lubricant from said source to said unit;

a resilient member urging said sensing piston against said pressure in said sensing chamber; and a rod connecting said sensing piston to said slide valve piston, said resilient member and said piston cooperating to move said slide valve piston toward a first position in response to an increase in said pressure in said sensing chamber and toward a second position in response to a decrease in said in said sensing chamber, said first position corresponding to a maximum oil flow and said second position corresponding to a minimum oil flow condition.

2. A turbine engine comprising in combination a compressor section, a turbine section; and a bypass fan or output shaft with a reduction gearbox operatively disposed between said turbine section and said bypass fan or output shaft;

an oil pump for delivering a flow of oil;

a fluid passage for communicating said flow of oil from said oil pump to said fan reduction gearbox; and a regulator in fluid communication with said compressor section for sensing a discharge pressure therefrom, said regulator being operatively disposed in said fluid passage and adapted to regulate said flow of oil in response to said discharge signal;

said regulator comprises a housing defining a gas chamber and a fluid chamber, said gas chamber being in fluid communication with said discharge pressure, said fluid chamber being operatively disposed in said fluid passage, said fluid chamber having an inlet adapted to receive said flow of oil from said fluid passage and a plurality of outlets for delivering said flow of oil to said fluid passage for conveyance to said fan reduction gearbox;

a sensing piston disposed within said gas chamber having a first surface exposed to said discharge pressure within said gas chamber;

a slide valve piston operatively connected to said sensing piston, said slide valve piston being disposed within said fluid chamber and being moveable between a first position in which said slide valve piston allows a relatively greater flow of oil through said plurality of outlets and a second position in which said slide valve piston allows a relatively lesser flow of oil thorough said plurality of outlets.

3. The turbine engine of claim 2, further comprising:

a resilient member acting on a second surface of said sensing piston to urge said sensing piston against said discharge pressure.

4. The turbine engine of claim 2, further comprising:

a first mechanical limit stop to limit motion of said slide valve piston in a first direction, wherein said slide valve piston limited by said first mechanical limit stop allows a relatively greater flow of oil through said plurality of outlets relative to said flow of oil with said slide valve piston in said second position.

5. The turbine engine of claim 4, further comprising:

a second mechanical limit stop to limit motion of said slide valve piston in a second direction, wherein said slide valve piston limited by said second mechanical limit stop allows a relatively greater flow of oil through said plurality of outlets relative to said flow of oil with said slide valve piston in said second position.

* * * * *